(12) United States Patent
Price et al.

(10) Patent No.: US 11,145,131 B2
(45) Date of Patent: *Oct. 12, 2021

(54) UTILIZING MACHINE LEARNING TO GENERATE AUGMENTED REALITY VEHICLE INFORMATION FOR A SCALE MODEL OF A VEHICLE

(71) Applicant: Capital One Services, LLC, McLean, VA (US)

(72) Inventors: Micah Price, McLean, VA (US);
Qiaochu Tang, McLean, VA (US);
Jason Hoover, McLean, VA (US);
Stephen Wylie, McLean, VA (US);
Geoffrey Dagley, McLean, VA (US);
Kristen Przano, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/740,854

(22) Filed: Jan. 13, 2020

(65) Prior Publication Data

US 2020/0265645 A1 Aug. 20, 2020

Related U.S. Application Data

(63) Continuation of application No. 16/277,843, filed on Feb. 15, 2019, now Pat. No. 10,535,201.

(51) Int. Cl.
*G06T 19/00* (2011.01)
*G06T 11/60* (2006.01)
(Continued)

(52) U.S. Cl.
CPC ........ *G06T 19/006* (2013.01); *G06F 3/04812* (2013.01); *G06Q 40/02* (2013.01);
(Continued)

(58) Field of Classification Search
CPC ....... G06T 19/006; G06T 11/60; G06T 11/00; G06Q 40/02; G08G 1/202; G06F 3/04812;
(Continued)

(56) References Cited

U.S. PATENT DOCUMENTS 7,079,114 B1 7/2006 Smith et al.
7,353,192 B1 4/2008 Ellis et al.
(Continued)

*Primary Examiner* — William A Beutel
(74) *Attorney, Agent, or Firm* — Harrity & Harrity, LLP

(57) ABSTRACT

A device receives an image including image data of a scale model of a vehicle, and processes the image data, with a model, to identify a make, a model, and a year represented by the scale model. The device determines augmented reality (AR) vehicle information based on the make, the model, and the year represented by the scale model of the vehicle, and provides the AR vehicle information to enable a user device to associate the AR vehicle information with the image of the scale model of the vehicle. The device receives an input associated with the AR vehicle information, and determines updated AR vehicle information based on the input associated with the AR vehicle information. The device provides the updated AR vehicle information to enable the user device to associate the updated augmented reality vehicle information with the image of the scale model of the vehicle.

20 Claims, 13 Drawing Sheets

(51) Int. Cl.
  *G06Q 40/02*    (2012.01)
  *G08G 1/00*    (2006.01)
  *G06F 3/0481*    (2013.01)
  *G06N 20/00*    (2019.01)

(52) U.S. Cl.
  CPC .............. *G06T 11/60* (2013.01); *G08G 1/202* (2013.01); *G06N 20/00* (2019.01)

(58) Field of Classification Search
  CPC . G06F 3/14; G06N 20/00; G06N 3/08; G06N 3/0454; G06N 7/005; G06N 20/10; G09G 2370/022; G06K 2209/23
  See application file for complete search history.

(56) References Cited

U.S. PATENT DOCUMENTS

| | | | |
|---|---|---|---|
| 9,922,356 B1 * | 3/2018 | Garcia, III | G03B 37/02 |
| 10,535,201 B1 | 1/2020 | Price et al. | |
| 2006/0075356 A1 | 4/2006 | Faulkner et al. | |
| 2010/0223158 A1 | 9/2010 | Brown et al. | |
| 2011/0112937 A1 | 5/2011 | Schorrbusch et al. | |
| 2011/0205242 A1 | 8/2011 | Friesen | |
| 2011/0307282 A1 | 12/2011 | Camp et al. | |
| 2012/0176409 A1 | 7/2012 | Noge | |
| 2013/0329943 A1 * | 12/2013 | Christopulos | G06K 9/00671 |
| | | | 382/103 |
| 2016/0180594 A1 | 6/2016 | Todeschini | |
| 2017/0304732 A1 | 10/2017 | Velic et al. | |
| 2018/0173953 A1 * | 6/2018 | Ghata | G06K 9/6202 |
| 2018/0286129 A1 * | 10/2018 | Harviainen | H04S 7/303 |
| 2019/0035282 A1 | 1/2019 | Ferguson et al. | |

\* cited by examiner

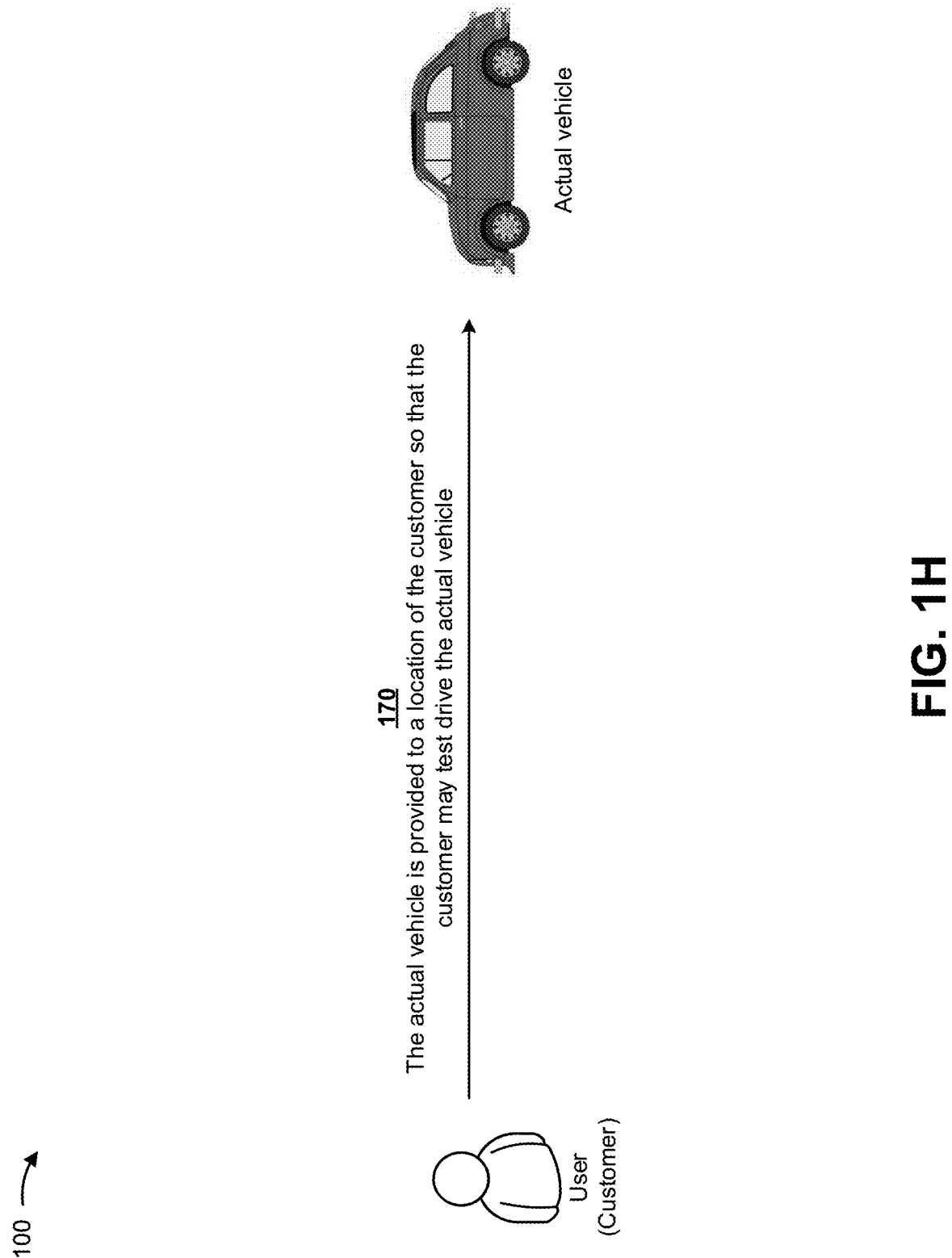

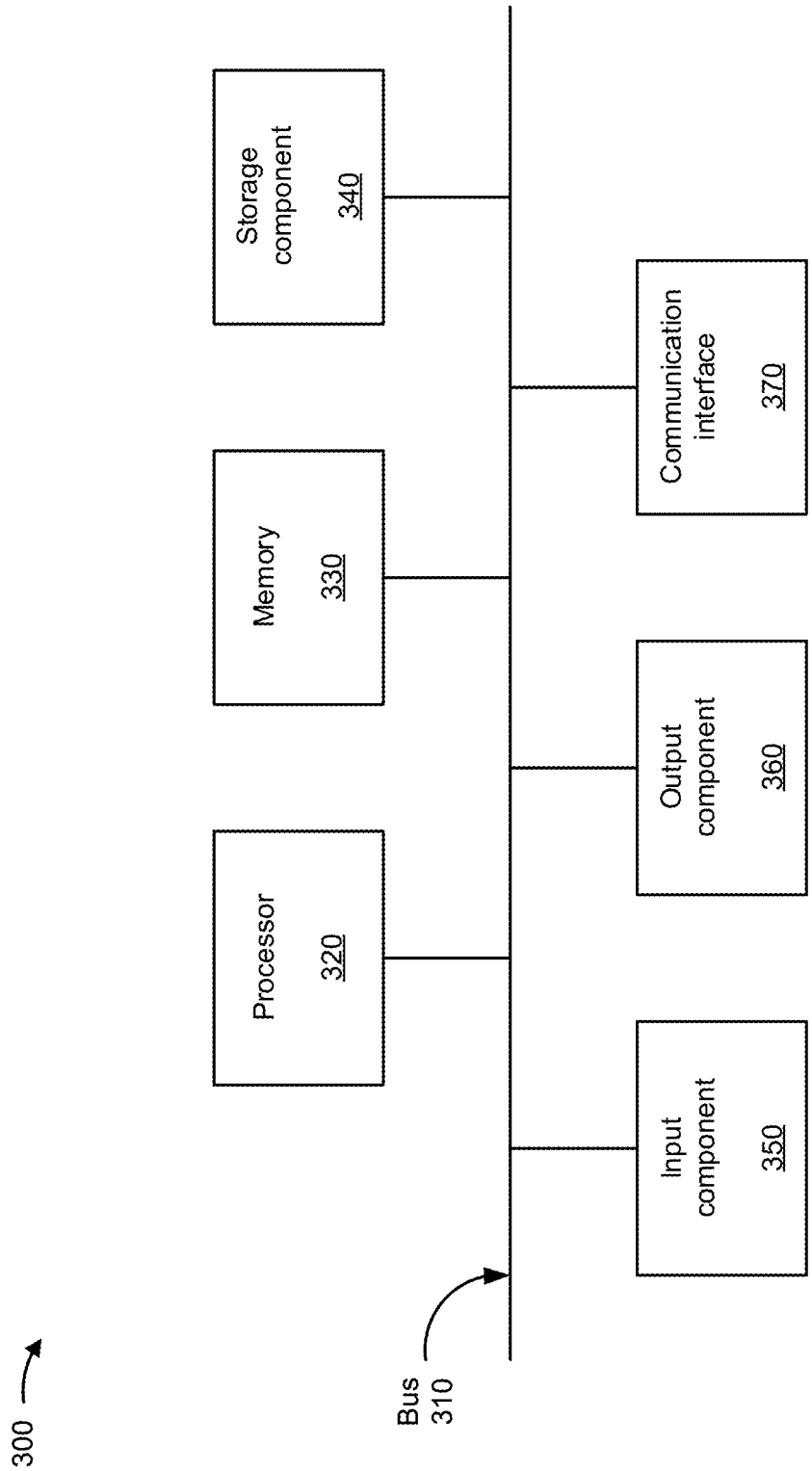

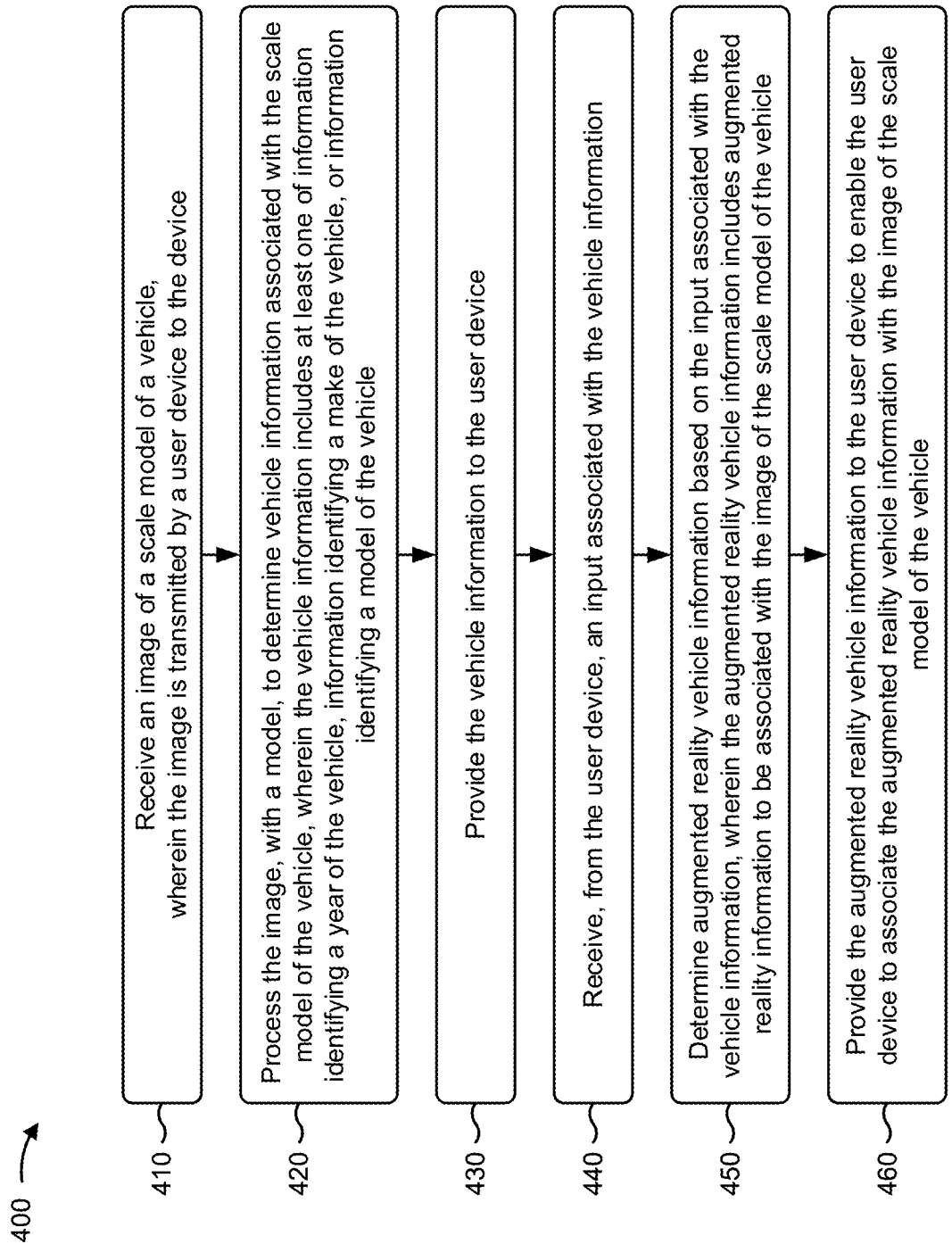

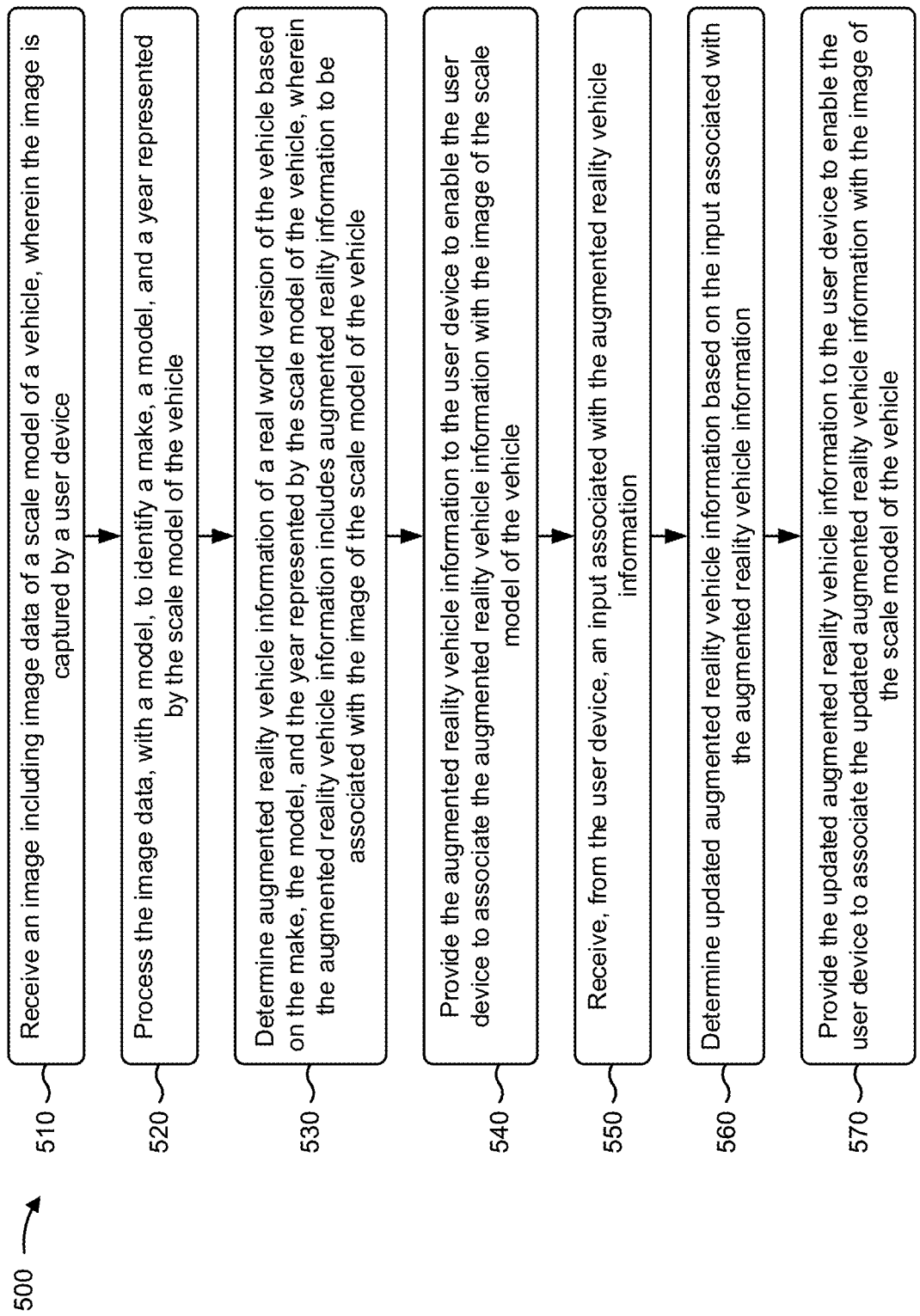

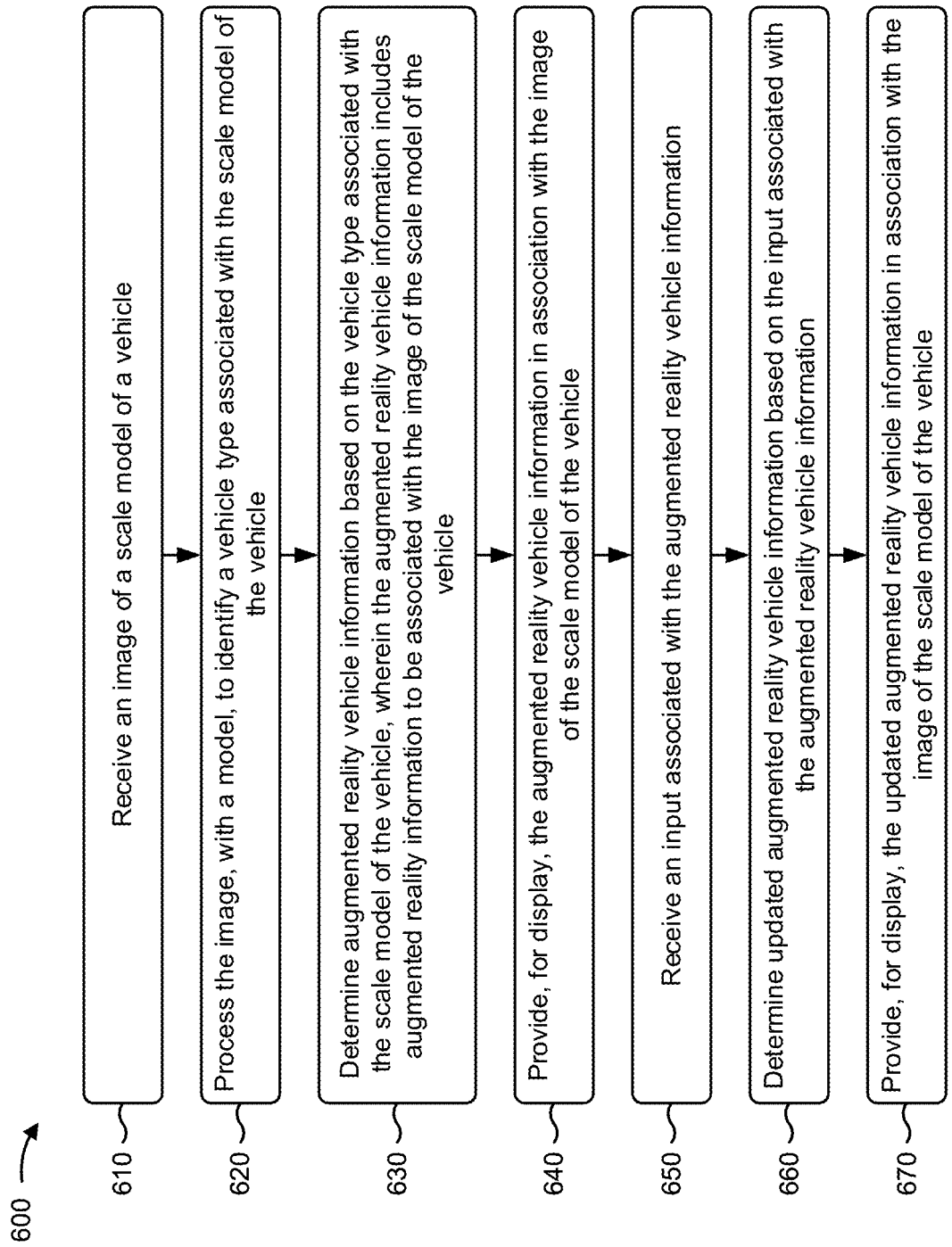

UTILIZING MACHINE LEARNING TO GENERATE AUGMENTED REALITY VEHICLE INFORMATION FOR A SCALE MODEL OF A VEHICLE

RELATED APPLICATION

This application is a continuation of U.S. patent application Ser. No. 16/277,843, filed Feb. 15, 2019 (now U.S. Pat. No. 10,535,201), which is incorporated herein by reference.

BACKGROUND

Vehicle dealerships are one of the few remaining businesses that have yet to be replaced by e-commerce websites. This is due to customers wanting more from a vehicle-buying experience than what a simple click of a button can provide. Customers want education about the vehicles, test drives of the vehicles, all-around service for the vehicles, and/or the like. In order to sell vehicles, vehicle dealerships typically maintain large lots of new and/or used vehicles for customers to view and/or test drive.

SUMMARY

According to some implementations, a method may include receiving an image of a scale model of a vehicle, wherein the image may be transmitted by a user device, and processing, the image, with a model, to determine vehicle information associated with the scale model of the vehicle, wherein the vehicle information includes at least one of information identifying a year of the vehicle, information identifying a make of the vehicle, or information identifying a model of the vehicle. The method may include providing the vehicle information to the user device, and receiving, from the user device, an input associated with the vehicle information. The method may include determining augmented reality vehicle information based on the input associated with the vehicle information, wherein the augmented reality vehicle information may include augmented reality information to be associated with the image of the scale model of the vehicle, and providing the augmented reality vehicle information to the user device to enable the user device to associate the augmented reality vehicle information with the image of the scale model of the vehicle.

According to some implementations, a device may include one or more memories, and one or more processors, communicatively coupled to the one or more memories, configured to receive an image including image data of a scale model of a vehicle, wherein the image may be captured by a user device. The one or more processors may process the image data, with a model, to identify a make, a model, and a year represented by the scale model of the vehicle, and may determine augmented reality vehicle information of a real world version of the vehicle based on the make, the model, and the year represented by the scale model of the vehicle, wherein the augmented reality vehicle information may include augmented reality information to be associated with the image of the scale model of the vehicle. The one or more processors may provide the augmented reality vehicle information to the user device to enable the user device to associate the augmented reality vehicle information with the image of the scale model of the vehicle, and may receive, from the user device, an input associated with the augmented reality vehicle information. The one or more processors may determine updated augmented reality vehicle information based on the input associated with the augmented reality vehicle information, and may provide the updated augmented reality vehicle information to the user device to enable the user device to associate the updated augmented reality vehicle information with the image of the scale model of the vehicle.

According to some implementations, a non-transitory computer-readable medium may store instructions that include one or more instructions that, when executed by one or more processors of a user device, cause the one or more processors to receive an image of a scale model of a vehicle, and process the image, with a model, to identify a vehicle type associated with the scale model of the vehicle. The one or more instructions may cause the one or more processors to determine augmented reality vehicle information based on the vehicle type associated with the scale model of the vehicle, wherein the augmented reality vehicle information may include augmented reality information to be associated with the image of the scale model of the vehicle. The one or more instructions may cause the one or more processors to provide, for display, the augmented reality vehicle information in association with the image of the scale model of the vehicle, and receive an input associated with the augmented reality vehicle information. The one or more instructions may cause the one or more processors to determine updated augmented reality vehicle information based on the input associated with the augmented reality vehicle information, and provide, for display, the updated augmented reality vehicle information in association with the image of the scale model of the vehicle.

BRIEF DESCRIPTION OF THE DRAWINGS

FIGS. 1A-1H are diagrams of an example implementation described herein.

FIG. 3 is a diagram of example components of one or more devices of FIG. 2.

FIGS. 4-6 are flow charts of example processes for utilizing machine learning to generate augmented reality vehicle information for a scale model of a vehicle.

DETAILED DESCRIPTION

Figure 1A:
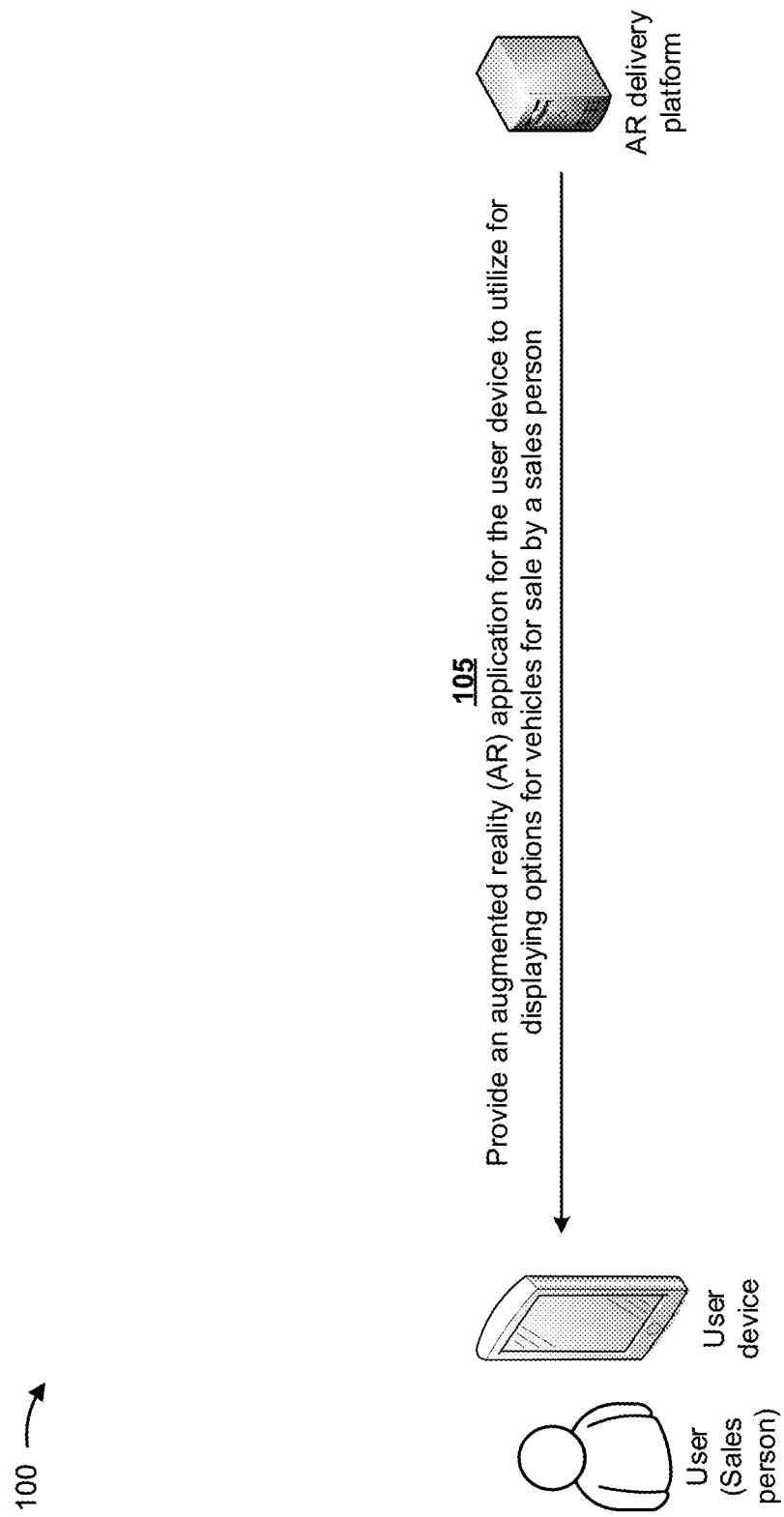

The following detailed description of example implementations refers to the accompanying drawings. The same reference numbers in different drawings may identify the same or similar elements.

Maintaining large lots of new and/or used vehicles for customers to view and/or test drive at vehicle dealerships requires buying and/or leasing properties for the lots. Such properties are cumbersome to maintain and expensive to buy and/or lease for vehicle dealerships. Furthermore, a large inventory of new and/or used vehicles is also cumbersome to maintain and expensive for vehicle dealerships.

Some implementations described herein provide an augmented reality (AR) delivery platform that utilizes machine learning to generate augmented reality vehicle information for a scale model of a vehicle. For example, the AR delivery platform may receive an image of a scale model of a vehicle, wherein the image may be transmitted by a user device, and may process the image, with a machine learning model, to determine vehicle information associated with the scale model of the vehicle, wherein the vehicle information may include at least one of the image of the scale model of the vehicle, information identifying a year of the vehicle, information identifying a make of the vehicle, or information identifying a model of the vehicle. The AR delivery platform may provide the vehicle information to the user device, and may receive, from the user device, an input associated with the vehicle information. The AR delivery platform may determine AR vehicle information based on the input associated with the vehicle information, wherein the AR vehicle information may include AR information to be associated with the image of the scale model of the vehicle, and may provide the AR vehicle information to the user device to enable the user device to associate the augmented reality vehicle information with the image of the scale model of the vehicle.

In this way, a dealership or showroom need only display scale models of vehicles that represent real world vehicles in an inventory, for order, and/or the like. A customer may walk around the scale model showroom and browse vehicles in AR (or virtual reality) as if the customer is on a vehicle lot or in a showroom. Thus, the AR delivery platform provides a practical, inexpensive, and convenient way to display inventories of new and/or used vehicles to customers. The AR delivery platform may provide augmented reality information that enables a vehicle dealership to display entire inventories of new and/or used vehicles to customers, without requiring the vehicle dealership to purchase and/or lease properties for the new and/or used vehicles. By displaying entire inventories of new and/or used vehicles to customers, the AR delivery platform may conserve resources (e.g., processing resources, memory resources, transportation resources, real estate resources, and/or like) that would otherwise be used to provide and/or manage the entire inventories of new and/or used vehicles.

Figure 1B:
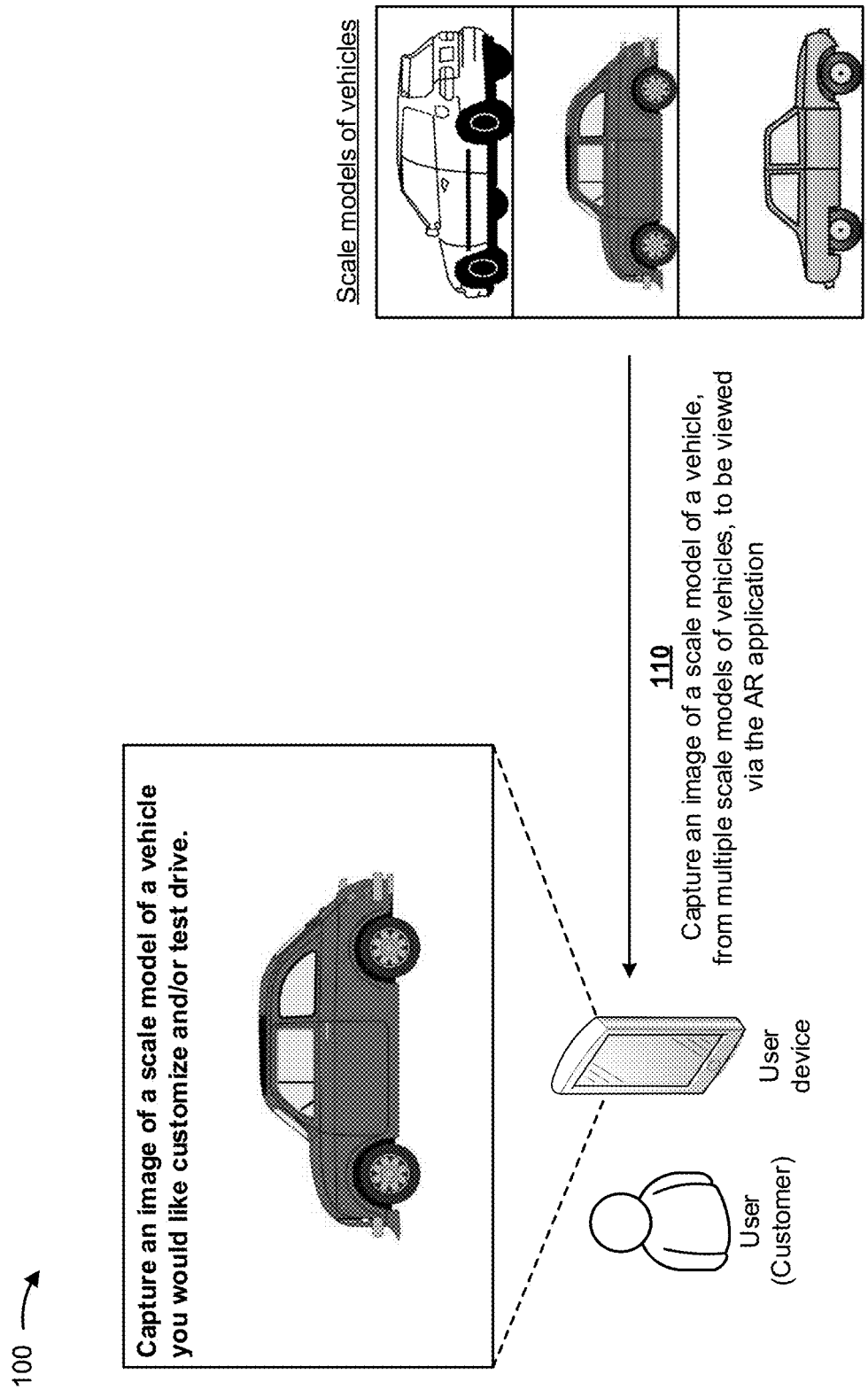

FIGS. 1A-1H are diagrams of an example implementation 100 described herein. As shown in FIGS. 1A-H, a user device, associated with a user (e.g., a sales person associated with a vehicle dealership), may be associated with an augmented reality (AR) delivery platform. In some implementations, the user of the user device may be at a location associated with a vehicle manufacturer or a vehicle dealership that may not maintain actual vehicles at the location or in a lot that is walkable or viewable by the user. In some embodiments, the location may include actual vehicles viewable on site (or associated with the site) as well as a showroom or other area that displays a stock of scale models of vehicles. The stock of scale models may be associated with a vehicle dealership (as shown in FIG. 1B) or a vehicle manufacturer, and may represent scale models of an actual make, model, and year (as well as trim) vehicles that are available or accessible to the vehicle dealership or manufacturer. As shown in FIG. 1A, and by reference number 105, the AR delivery platform may provide an augmented reality (AR) application to the user device. In some implementations, the user may utilize the user device to download the AR application from the AR delivery platform. In some implementations, the AR delivery platform may automatically provide the AR application to the user device (e.g., based on a request from the user device).

In some implementations, the user may utilize the user device to receive the AR application from the AR delivery platform, and may install the AR application on the user device. The user device may be associated with the location. The AR application may enable the user device to display options for vehicles offered for sale by (or otherwise available to) the dealership (e.g., as represented by the scale models of the vehicle), may associate different AR vehicle information (e.g., vehicle colors, vehicle options, vehicle additions, vehicle interiors) with a captured image and/or a streaming image of a scale model of the vehicle, and/or the like. In this way, the AR application may enable a customer of the dealership to view a variety of options associated with a particular make, model, and/or year of a vehicle via AR vehicle information and the scale model of the vehicle. Although implementations described herein relate to AR, the implementations may also be replicated using virtual reality (VR) or a combination of AR and VR.

In some implementations, a sales person may register the AR application and/or the sales person with the AR delivery platform. In such implementations, the AR delivery platform may receive, from the user device, registration information for registering the AR application and/or the sales person with the AR delivery platform. In some implementations, the registration information may include information indicating proof of an identity of the sales person (e.g., a name of the sales person, a location of the vehicle dealership, an email address of the sales person, and/or the like); information indicating the location of the vehicle dealership (e.g., global positioning system (GPS) coordinates of the user device, an address of the vehicle dealership, and/or the like); and/or the like.

As shown in FIG. 1B, another user (e.g., a customer or a potential customer of the vehicle dealership) may visit the vehicle dealership and may utilize the user device with the AR application to review an inventory of vehicles associated with the vehicle dealership. In some implementations, the vehicle dealership may be replaced with a vehicle showroom, a pop-up kiosk, a portable display, any location sized to display a scale model, a vehicle manufacturer, and/or the like. In some implementations, the inventory of vehicles may be represented by scale models of the vehicles provided at the vehicle dealership. In some implementations, the scale models of the vehicles may be scaled (e.g., 1:16, 1:24, and/or the like) replicas of the vehicles (e.g., base models of the vehicles) that may be manipulated by the AR delivery platform (e.g., via AR vehicle information) to present the inventory of vehicles. In this way, the vehicle dealership may present the entire inventory of vehicles in a small amount of space (e.g., in a mall, a small store, at a kiosk, and/or the like), thereby reducing costs associated with real estate leases and/or ownership, managing and providing security for the inventory of vehicles, and/or the like. In some implementations, the inventory of actual vehicles may be stored at a location (e.g., with reduced real estate costs) that is close enough to a location of a vehicle dealership so that customers may test drive the actual vehicles, or so that an actual vehicle may be provided on-demand (e.g., delivered to a user location) same day or sooner (e.g., within an hour or hours).

As further shown in FIG. 1B, and by reference number 110, the customer may utilize the user device to capture an image of a scale model of a vehicle from the multiple scale models of vehicles, and the user device (e.g., the AR application) may present the image of the scale model of the vehicle to the customer (e.g., via a user interface). In some implementations, the image may include image data of the scale model of the vehicle. In some implementations, the customer may utilize the user device to capture and display live streaming image data of the scale model of the vehicle (e.g., via an electronic viewfinder, of a camera of the user device, that electronically projects an image captured by the camera onto a display of the user device).

Figure 1C:
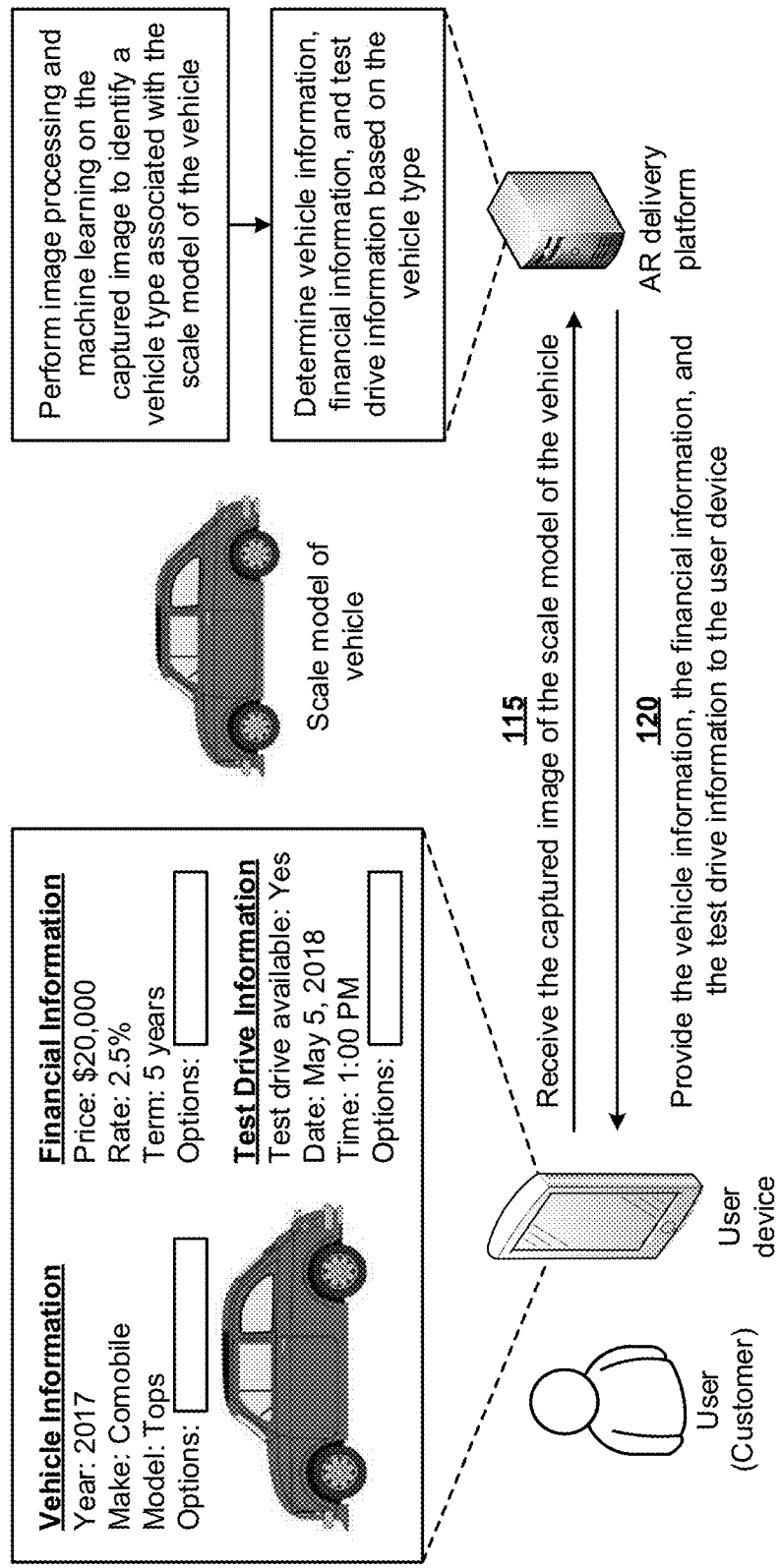

As shown in FIG. 1C, and by reference number 115, the AR delivery platform may receive, from the user device, the captured image of the scale model of the vehicle. In some implementations, the user device may provide the captured image of the scale model of the vehicle to the AR delivery platform when the image is captured, based on input from the customer, based on a request from the AR delivery platform, and/or the like. In some implementations, the user device may stream the live streaming image data of the scale model of the vehicle to the AR delivery platform as the live streaming image data is received by the user.

As further shown in FIG. 1C, the AR delivery platform may perform image processing and/or machine learning on the captured image to identify a vehicle type (e.g., a vehicle make, model, year, and/or the like) associated with the scale model of the vehicle. In some implementations, the user device may perform the image processing and/or the machine learning on the captured image. In some implementations, the AR delivery platform may utilize image analysis, as an image processing technique, to extract meaningful information (e.g., a shape of the scale model of the vehicle, text or logos indicating a make and/or a model of the scale model of the vehicle, and/or the like) from the captured image. In some implementations, the image processing technique may include two-dimensional (2D) object recognition, three-dimensional (3D) object recognition, image segmentation, motion detection, video tracking, machine learning techniques (e.g., Viola-Jones object detection framework based on Haar features, scale-invariant feature transform (SIFT) (e.g., a feature extraction technique), histogram of oriented gradients (HOG) features (e.g., a feature extraction technique), a support vector machine, a logistic regression, and/or the like), deep learning techniques (e.g., region proposals, single shot multibox detector (SSD) (e.g., a convolutional neural network or CNN), you only look once (YOLO) (e.g., a CNN), and/or the like), and/or the like.

In some implementations, the image processing technique may include a computer vision technique that receives data from images and/or videos and extracts useful information from the data. The computer vision technique may perform image recognition (e.g., determining what is depicted in an image and/or a video), object detection or object recognition (e.g., draw a box around objects in an image and/or a video), image segmentation (e.g., label each pixel as being part of an object, draw an outline around an object, etc.), and/or the like. In some implementations, the computer vision technique may include performing feature extraction (e.g., converting pixel data into a more useful representation for a model), and providing the extracted features to the model to generate predictions. The model may include a supervised machine learning model (e.g., a model that progressively improves performance on a task by training on labeled data), hand-coded rules, and/or the like. Alternatively, the computer vision technique may omit the feature extraction and may utilize deep learning approaches to generate predictions directly from the pixel data. Further details of the computer vision technique are provided in U.S. patent application Ser. No. 15/915,329, filed Mar. 8, 2018, U.S. patent application Ser. No. 15/916,032, filed Mar. 8, 2018, U.S. patent application Ser. No. 15/916,137, filed Mar. 8, 2018, the contents of which are incorporated by reference herein in their entireties.

In some implementations, the scale model of the vehicle may include a vehicle type identification mechanism (e.g., an indicia, a barcode, a serial number, a matrix code (e.g., a QR code), and/or the like, which may be visible to the human eye or undetectable to the human eye and detectable using non-visible or infrared light) that may be captured by the user device and may provide an indication of the vehicle type associated with the scale model of the vehicle. In some implementations, the scale model of the vehicle may include AR markers that indicate where to provide AR content in relation to the scale model of the vehicle. While the example implementations describe identifying a vehicle type of a scale model of a vehicle using image recognition, the type of the vehicle may be identified by other means, such as scanning or capturing an identification mechanism associated with the model.

In some implementations, the AR delivery platform may process the captured image of the scale model of the vehicle, with a machine learning model, to identify the vehicle type associated with the scale model of the vehicle. In some implementations, the machine learning model may include a pattern recognition model that identifies the vehicle type associated with the scale model of the vehicle. For example, the machine learning model may analyze the captured image of the scale model of the vehicle to extract meaningful information (e.g., a shape of the scale model of the vehicle, text or logos indicating a make and/or a model of the scale model of the vehicle, and/or the like) from the captured image, or may receive the extracted information as a result of the image processing technique. The machine learning model may compare the extracted information with information indicating vehicle types associated with a variety of vehicles, and may match the extracted information with at least one of the vehicle types associated with the variety of vehicles.

In some implementations, the AR delivery platform may perform a training operation on the machine learning model with vehicle type information associated with a variety of vehicles. In some implementations, the vehicle type information may include information indicating vehicle shapes, distinguishing vehicle features, logos provided on vehicles, text provided on vehicles, and/or the like.

The AR delivery platform may separate the vehicle type information into a training set, a validation set, a test set, and/or the like. The training set for image recognition may include sets of labeled images (e.g., thousands of real images or photographs taken at different angles of the scale model of the vehicle and labeled with the vehicle make, model, and year). In some implementations, the AR delivery platform may train the machine learning model using, for example, a supervised training procedure and based on the vehicle type information. For example, the AR delivery platform may perform dimensionality reduction to reduce the vehicle type information to a minimum feature set, thereby reducing resources (e.g., processing resources, memory resources, and/or the like) to train the machine learning model, and may apply a classification technique to the minimum feature set.

In some implementations, the AR delivery platform may use a logistic regression classification technique to determine a categorical outcome (e.g., that the vehicle type information indicates that a particular vehicle type is associated with a particular shape, particular features, and/or the like). Additionally, or alternatively, the AR delivery platform may use a naïve Bayesian classifier technique. In this case, the AR delivery platform may perform binary recursive partitioning to split the vehicle type information into partitions and/or branches, and use the partitions and/or branches to perform predictions (e.g., that the vehicle type information indicates that a particular vehicle type is associated with a particular shape, particular features, and/or the like). Based on using recursive partitioning, the AR delivery platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the AR delivery platform may use a support vector machine (SVM) classifier technique and/or logistic regression to generate a non-linear boundary between data points in the training set. In this case, the non-linear boundary is used to classify test data into a particular class.

Additionally, or alternatively, the AR delivery platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the AR delivery platform may use one or more other model training techniques, such as a neural network technique, a latent semantic indexing technique, and/or the like. For example, the AR delivery platform may perform an artificial neural network processing technique (e.g., using a two-layer feedforward neural network architecture, a three-layer feedforward neural network architecture, and/or the like) to perform pattern recognition with regard to patterns of the vehicle type information. In this case, using the artificial neural network processing technique may improve an accuracy of the trained machine learning model generated by the AR delivery platform by being more robust to noisy, imprecise, or incomplete data, and by enabling the AR delivery platform to detect patterns and/or trends undetectable to human analysts or systems using less complex techniques.

As further shown in FIG. 1C, the AR delivery platform may determine vehicle information, financial information, and/or test drive information based on the identified vehicle type associated with the scale model of the vehicle. In some implementations, the vehicle information may include information identifying a make of the vehicle associated with the vehicle type, a model of the vehicle associated with the vehicle type, a year of the vehicle associated with the vehicle type, colors available for the vehicle associated with the vehicle type, interiors available for the vehicle associated with the vehicle type, colors of the interiors, safety options available for the vehicle associated with the vehicle type, other vehicle options available for the vehicle associated with the vehicle type, and/or the like. In some implementations, the vehicle information may include augmented reality (AR) vehicle information that may be used to associate the vehicle information with the image of the scale model of the vehicle and/or with the scale model of the vehicle. For example, the vehicle information associated with the colors available for the vehicle may include images and/or text identifying the available colors. When an image and/or text identifying a particular color is selected and/or hovered over, the AR delivery platform and/or user device may cause AR vehicle information (e.g., the particular color) to be associated with and displayed on the image of the scale model of the vehicle and/or on the scale model of the vehicle.

In some implementations, the financial information may be associated with actual new or used vehicles and may include a price of an actual vehicle associated with a dealer, a MSRP, and/or the like. In some implementations, the vehicle options may include colors available on the vehicle lot, colors available from manufacturers, and/or the like. For example, based on the scale model captured, vehicle information specific to a particular vehicle on the lot represented by that scale model (e.g., if there are more than one vehicle) may be provided, but additional vehicle information associated with the multiple vehicles may also be provided (e.g., and the customer may select a test drive for any of the multiple vehicles, obtain financing information specific to one of the multiple vehicles etc.).

In some implementations, the AR delivery platform may utilize the vehicle information (e.g., the make, model, and/or year) to access a database or other backend device to retrieve records associated with real vehicles, manufacturer configuration information associated with the vehicles, and/or the like. The database may be specific to a dealership, may be limited by location (e.g., within a quantity of miles), and/or the like.

In some implementations, the AR delivery platform may utilize the vehicle information to access a database or other backend device to retrieve financial records associated with real vehicles and based on a financial history of the customer.

In some implementations, the financial information may include information identifying a price for the vehicle associated with the vehicle type, a financing rate for the vehicle associated with the vehicle type, a financing term for the vehicle associated with the vehicle type, financing terms for purchasing the vehicle associated with the vehicle type, financing terms for leasing the vehicle associated with the vehicle type, and/or the like. In some implementations, the financial information may be personalized for an actual vehicle and based on the customer's qualifications (e.g. credit score).

In some implementations, the test drive information may include information identifying whether a test drive is available for the vehicle associated with the vehicle type, a date when the test drive is available for the vehicle associated with the vehicle type, a time when the test drive is available for the vehicle associated with the vehicle type, a location of the test drive for the vehicle associated with the vehicle type (e.g., the location of the customer, a location remote from the location of the customer, and/or the like), and/or the like.

As further shown in FIG. 1C, and by reference number 120, the AR delivery platform may provide the vehicle information, the financial information, and/or the test drive information, to the user device. The user device may receive the vehicle information, the financial information, and/or the test drive information, and may display the vehicle information, the financial information, and/or the test drive information to the customer via a user interface. For example, the user interface may include vehicle information indicating that the vehicle was manufactured in 2017, that the vehicle make is a Comobile, that the vehicle model is a Tops, and options available for the vehicle. The user interface may include financial information indicating that a price of the vehicle is $20,000, that a financing rate of the vehicle is 2.5%, that a financing term of the vehicle is five years, and/or financial options available for the vehicle. The user interface may include test drive information indicating that a test drive is available for the vehicle, that the test drive is scheduled for May 5, 2018 at 1:00 PM, and test drive options available for the vehicle. In some implementations, the user interface may display information associated with an image of the scale model, information associated with images of real vehicles on a lot, information that is overlaid onto the image of the scale model, information that is provided in a "window" above the scale model, and/or the like.

Figure 1D:
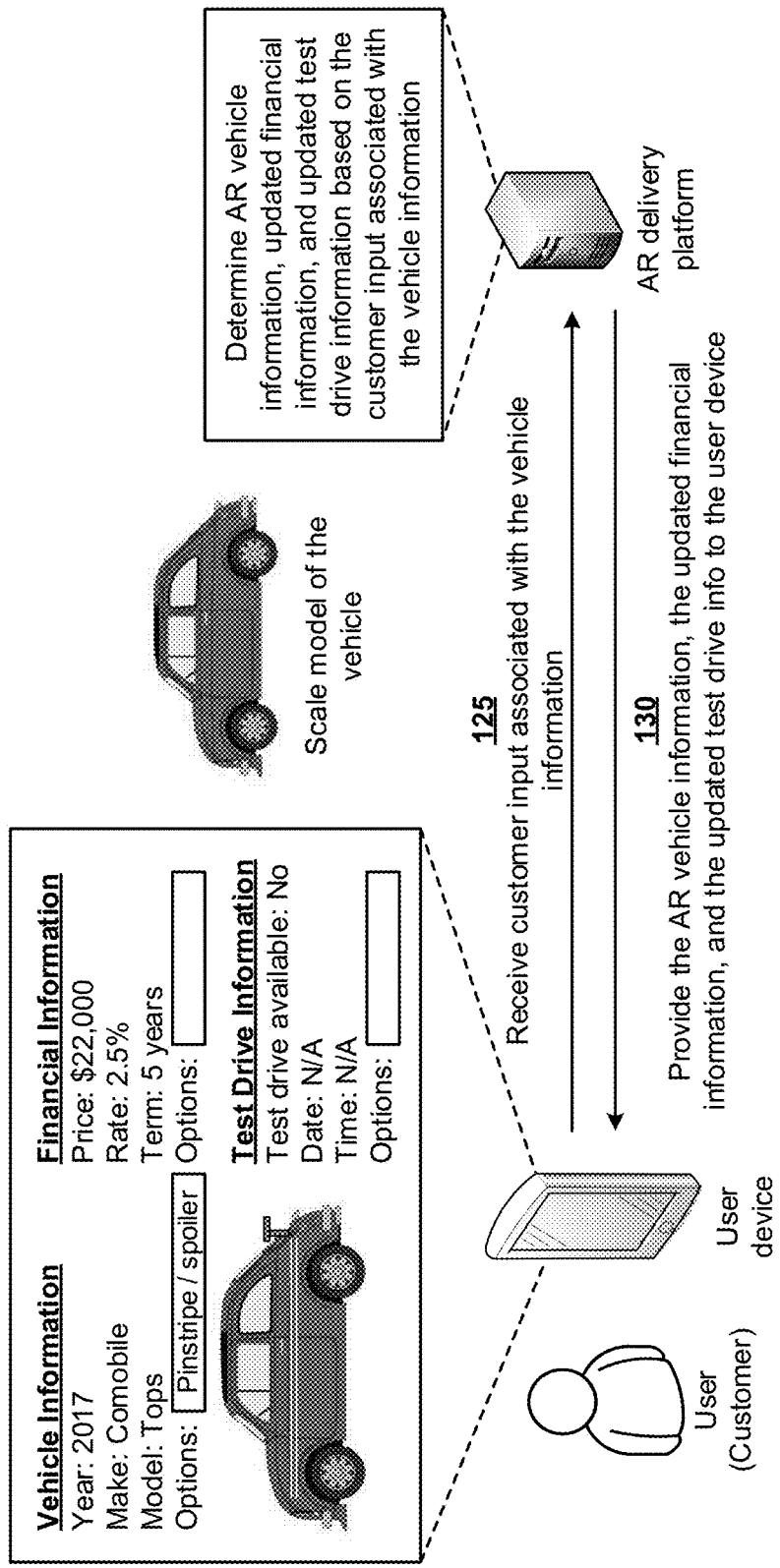

As shown in FIG. 1D, the customer may interact with the vehicle information provided by the user interface, and may provide an input indicating that the customer wishes to, for example, display a pinstripe and a spoiler on the vehicle. Based on the customer input, the user device may provide the customer input associated with the vehicle information to the AR delivery platform. As shown in FIG. 1D, and by reference number 125, the AR delivery platform may receive the customer input associated with the vehicle information (e.g., indicating that the customer wishes to see a pinstripe and a spoiler on the vehicle).

As further shown in FIG. 1D, the AR delivery platform may determine AR vehicle information, updated financial information, and/or updated test drive information based on the customer input associated with the vehicle information. In some implementations, the AR vehicle information may include vehicle information requested by the customer based on the customer input. For example, the AR vehicle information may include AR information depicting the pinstripe and the spoiler to be displayed on the captured image of the scale model of the vehicle. The updated financial information may include the financial information described above in connection with FIG. 1C, but may be updated to indicate that the price of the vehicle will increase from $20,000 to $22,000 with the addition of the pinstripe and the spoiler. The test drive information may include the test drive information described above in connection with FIG. 1C, but may be updated to indicate that no test drive is available for a vehicle that includes the pinstripe and the spoiler. In some implementations, the pinstripe and the spoiler may be applied in AR to the scale model of the vehicle, to a two-dimensional image of the vehicle that is being viewed in AR, to a two-dimensional image of the vehicle being viewed on the display of the user device.

As further shown in FIG. 1D, and by reference number 130, the AR delivery platform may provide the AR vehicle information, the updated financial information, and/or the updated test drive information to the user device. The user device may receive the AR vehicle information, the updated financial information, and/or the updated test drive information, and may display the AR vehicle information, the updated financial information, and/or the updated test drive information to the customer via a user interface. For example, the user interface may include the vehicle information described above in connection with FIG. 1C, and may display an augmented reality pinstripe and spoiler on the captured image of the scale model of the vehicle. The user interface may include the financial information described above in connection with FIG. 1C, and information indicating that an updated price of the vehicle (e.g., with the pinstripe and the spoiler) is $22,000. The user interface may include the test drive information described above in connection with FIG. 1C, and information indicating that a test drive is not available for the vehicle with the pinstripe and the spoiler.

Figure 1E:
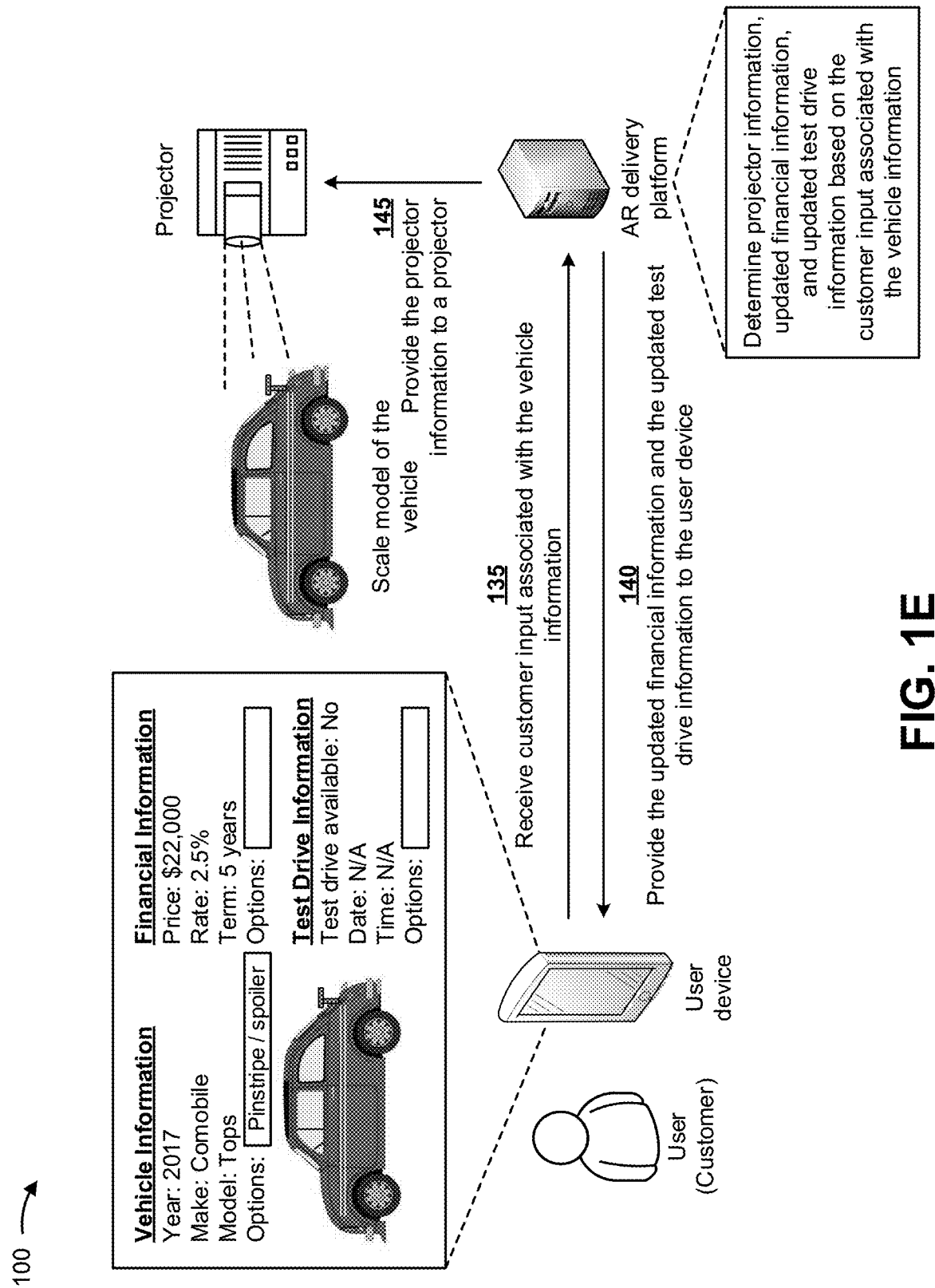

As shown in FIG. 1E, the customer may interact with the vehicle information provided by the user interface of FIG. 1C, and may provide an input indicating that the customer wishes to display the pinstripe and the spoiler on the vehicle. Based on the customer input, the user device may provide the customer input associated with the vehicle information to the AR delivery platform. As shown in FIG. 1E, and by reference number 135, the AR delivery platform may receive the customer input associated with the vehicle information (e.g., indicating that the customer wishes to see the pinstripe and the spoiler on the vehicle).

As further shown in FIG. 1E, the AR delivery platform may determine projector information, updated financial information, and/or updated test drive information based on the customer input associated with the vehicle information. In some implementations, the projector information may include vehicle information requested by the customer based on the customer input (e.g., and to be projected on the scale model of the vehicle). For example, the projector information may include information depicting the pinstripe and the spoiler (e.g., a holographic rendering) to be projected (e.g., by a projector) on the scale model of the vehicle. The updated financial information may include the financial information described above in connection with FIG. 1C, but may be updated to indicate that the price of the vehicle will increase from $20,000 to $22,000 with the addition of the pinstripe and the spoiler. The test drive information may include the test drive information described above in connection with FIG. 1C, but may be updated to indicate that no test drive is available for a vehicle that includes the pinstripe and the spoiler.

As further shown in FIG. 1E, and by reference number 140, the AR delivery platform may provide the updated financial information and/or the updated test drive information to the user device. The user device may receive the updated financial information and/or the updated test drive information, and may display the updated financial information and/or the updated test drive information to the customer via a user interface. For example, the user interface may include the financial information described above in connection with FIG. 1C, and information indicating that an updated price of the vehicle (e.g., with the pinstripe and the spoiler) is $22,000. The user interface may include the test drive information described above in connection with FIG. 1C, and information indicating that a test drive is not available for the vehicle with the pinstripe and the spoiler.

As further shown in FIG. 1E, and by reference number 145, the AR delivery platform may provide the projector information to a projector associated with the scale model of the vehicle. The projector may receive the projector information, and may project the projector information on the scale model of the vehicle. For example, the projector may project a pinstripe and a spoiler on the scale model of the vehicle. In some implementations, the user device may capture an image or streaming image data of the scale model of the vehicle with the pinstripe and the spoiler, and may display the captured image or streaming image data to the customer.

Figure 1F:
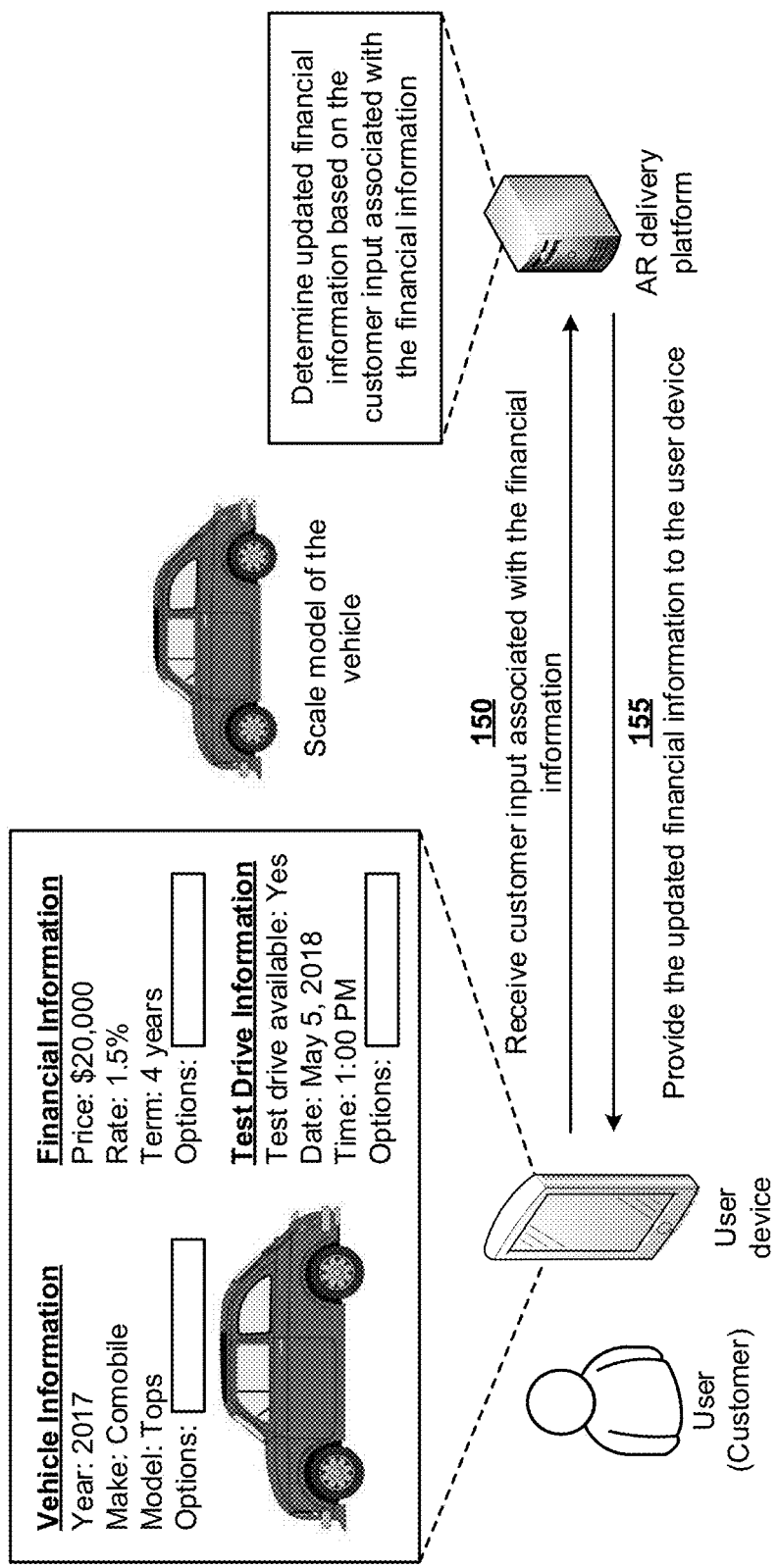

As shown in FIG. 1F, the customer may interact with the financial information provided by the user interface of FIG. 1C, and may provide an input indicating that the customer wishes to select a different financing rate (e.g., 1.5%) and a different financing term (e.g., four years) from a different financial institution. Based on the customer input, the user device may provide the customer input associated with the financial information to the AR delivery platform. As shown in FIG. 1F, and by reference number 150, the AR delivery platform may receive the customer input associated with the financial information (e.g., indicating that the customer wishes to select a different financing rate and a different financing term from a different financial institution).

As further shown in FIG. 1F, the AR delivery platform may determine updated financial information based on the customer input associated with the financial information. In some implementations, the updated financial information may include the financial information described above in connection with FIG. 1C, but may be updated to indicate the different financing rate, the different financing term, and/or a different monthly payment for the vehicle based on the different financing rate and/or the different financing term.

As further shown in FIG. 1F, and by reference number 155, the AR delivery platform may provide the updated financial information to the user device. The user device may receive the updated financial information and may display the updated financial information to the customer via a user interface. For example, the user interface may include the financial information described above in connection with FIG. 1C, and information indicating the different financing rate, the different financing term, the different monthly payment for the vehicle, and/or the like.

In some implementations, if the customer wishes to purchase or lease the vehicle based on the financial information or the updated financial information, the AR delivery platform may automatically provide, to a device associated with a financial institution, the financial information or the updated financial information, the vehicle information, personal information associated with the customer (e.g., a name of the customer, an address of the customer, a credit report of the customer, and/or the like, with the permission of the customer), and/or the like.

Figure 1G:
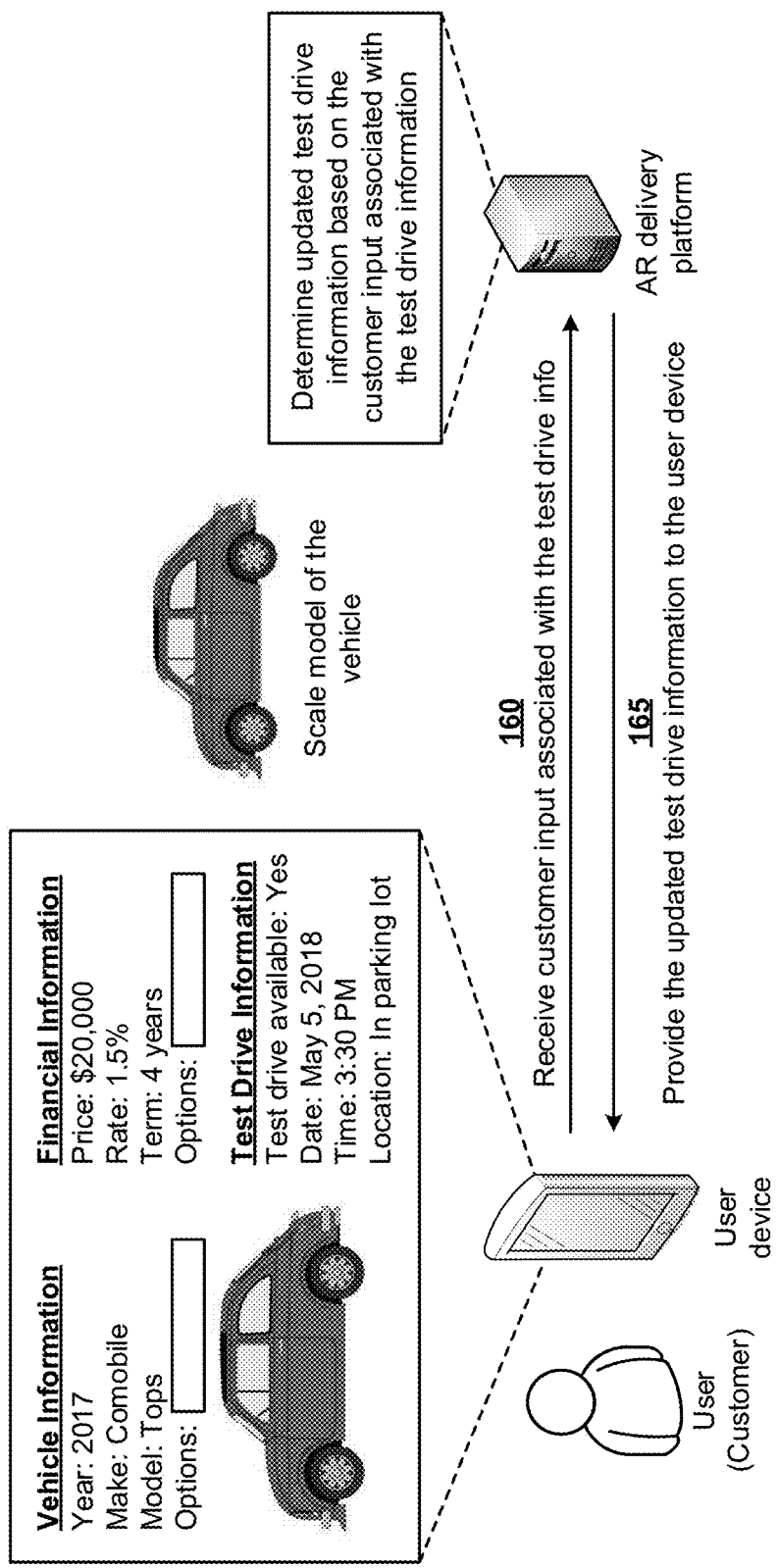

As shown in FIG. 1G, the customer may interact with the test drive information provided by the user interface of FIG. 1C, and may provide an input indicating that the customer wishes to test drive the vehicle on May 5, 2018 at 3:30 PM and wishes to pick up the vehicle in a parking lot near the customer. Based on the customer input, the user device may provide the customer input associated with the test drive information to the AR delivery platform. As shown in FIG. 1G, and by reference number 160, the AR delivery platform may receive the customer input associated with the test drive information (e.g., indicating that the customer wishes to test drive the vehicle on May 5, 2018 at 3:30 PM and wishes to pick up the vehicle in a parking lot near the customer).

As further shown in FIG. 1G, the AR delivery platform may determine updated test drive information based on the customer input associated with the test drive information. In some implementations, the updated test drive information may include the test drive information described above in connection with FIG. 1C, but may be updated to indicate the particular date, time, and location of the test drive (e.g., May 5, 2018, 3:30 PM, and the parking lot near the customer).

As further shown in FIG. 1G, and by reference number 165, the AR delivery platform may provide the updated test drive information to the user device. The user device may receive the updated test drive information and may display the updated test drive information to the customer via a user interface. For example, the user interface may include the test drive information described above in connection with FIG. 1C, and information indicating the particular date, time, and location of the test drive (e.g., May 5, 2018, 3:30 PM, and the parking lot near the customer).

In some implementations, the AR delivery platform may automatically provide, to the vehicle, instructions to drive to a particular location of the user device (e.g., the parking lot near the customer) on the particular date (e.g., May 5, 2018) and at the particular time (e.g., 3:30 PM). In some implementations, the AR delivery platform may provide, to the user device, walking or driving directions to a location of the vehicle, and the customer may utilize the directions to walk or drive to the vehicle for the test drive. In some implementations, the AR delivery platform may automatically provide, to another user device associated with an employee of the vehicle dealership, instructions to drive the vehicle to a particular location of the user device (e.g., the parking lot near the customer) on the particular date (e.g., May 5, 2018) and at the particular time (e.g., 3:30 PM). In some implementations, the AR delivery platform may provide, to the vehicle, navigation instructions for the vehicle to autonomously drive to the particular location of the user device.

As shown in FIG. 1H, and by reference number 170, the actual vehicle may be provided to the location of the customer (e.g., the parking lot near the customer), on the particular date and at the particular time, so that the customer may test drive the actual vehicle. In some implementations, the vehicle may automatically drive to the location of the customer based on the instructions, provided to the vehicle, to drive to a particular location of the user device (e.g., the parking lot near the customer) on the particular date (e.g., May 5, 2018) and at the particular time (e.g., 3:30 PM). In some implementations, the customer may walk or drive to the location of the vehicle based on the walking or driving directions provided to the user device. In some implementations, the employee of the vehicle dealership may drive the vehicle to the location of the customer based on the instructions to drive the vehicle to a particular location of the user device (e.g., the parking lot near the customer) on the particular date (e.g., May 5, 2018) and at the particular time (e.g., 3:30 PM).

In this way, several different stages of the process for utilizing machine learning to generate augmented reality vehicle information for a scale model of a vehicle are automated, thereby removing human subjectivity and waste from those stages of the process, and improving speed and efficiency of the process and conserving computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning to generate augmented reality vehicle information for a scale model of a vehicle. Finally, automating the process for utilizing machine learning to generate augmented reality vehicle information for a scale model of a vehicle conserves computing resources (e.g., processing resources, memory resources, and/or the like) that would otherwise be used to provide and/or manage the entire inventories of new and/or used vehicles.

In some implementations, the image recognition performed by the AR delivery platform may be configured to identify real vehicles and/or scale models of vehicles. Thus, the AR delivery platform may translate a scale model environment to the real world and may provide real world vehicle information (e.g., for actual vehicles on a lot, in a database, a generic vehicle that can be configured to purchase) using the scale models as proxies for real vehicles. The AR delivery platform may process information differently based on determining whether a vehicle is a scale model or a real vehicle.

As indicated above, FIGS. 1A-1H are provided merely as examples. Other examples may differ from what was described with regard to FIGS. 1A-1H.

Figure 2:
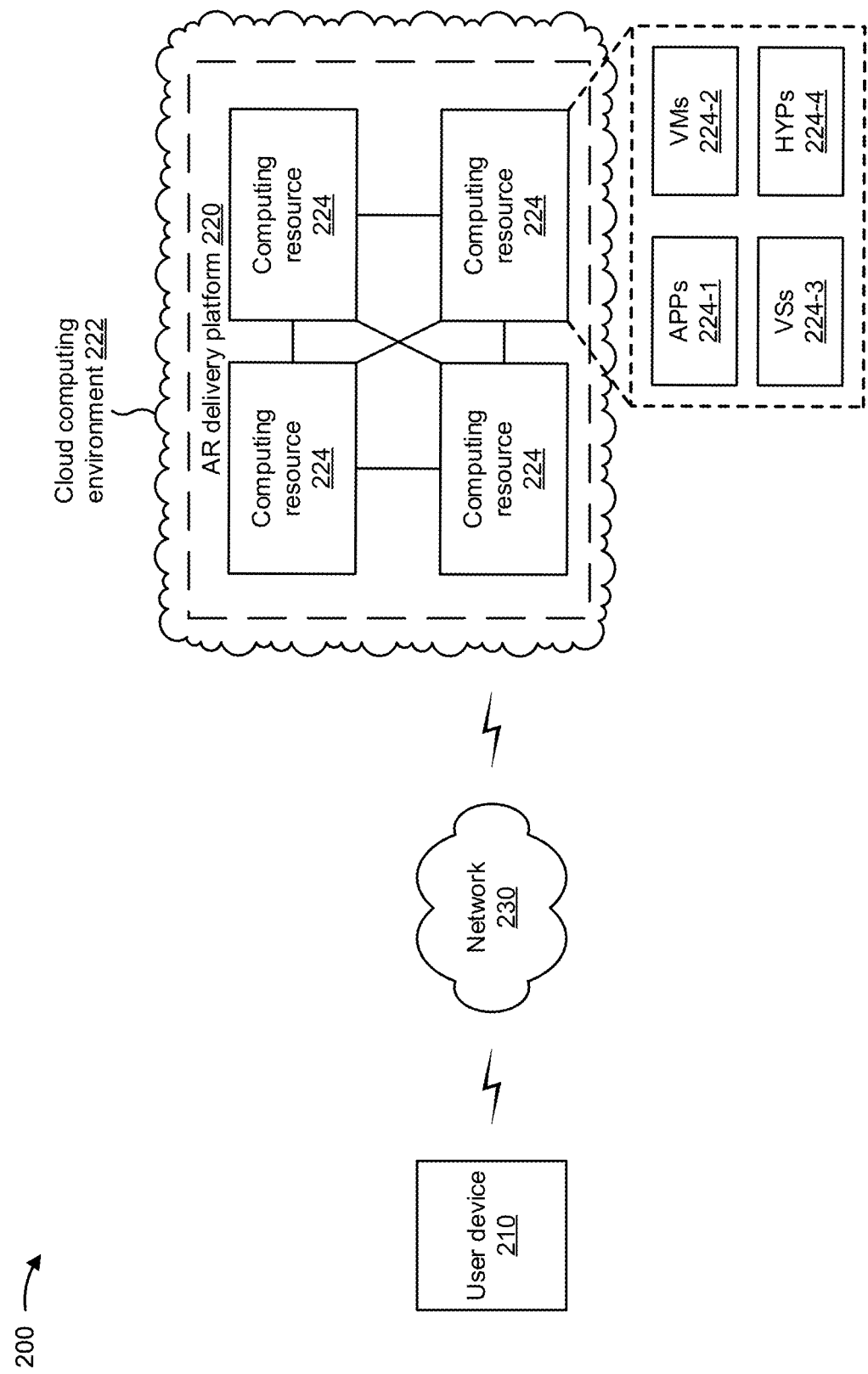
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an AR delivery platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to AR delivery platform 220.

AR delivery platform 220 includes one or more devices that may utilize machine learning to generate augmented reality vehicle information for a scale model of a vehicle. In some implementations, AR delivery platform 220 may be modular such that certain software components may be swapped in or out depending on a particular need. As such, AR delivery platform 220 may be easily and/or quickly reconfigured for different uses. In some implementations, AR delivery platform 220 may receive information from and/or transmit information to one or more user devices 210.

In some implementations, as shown, AR delivery platform 220 may be hosted in a cloud computing environment 222. Notably, while implementations described herein describe AR delivery platform 220 as being hosted in cloud computing environment 222, in some implementations, AR delivery platform 220 may be non-cloud-based (i.e., may be implemented outside of a cloud computing environment) or may be partially cloud-based.

Cloud computing environment 222 includes an environment that may host AR delivery platform 220. Cloud computing environment 222 may provide computation, software, data access, storage, etc. services that do not require end-user knowledge of a physical location and configuration of system(s) and/or device(s) that host AR delivery platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host AR delivery platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with AR delivery platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of AR delivery platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to user device 210, AR delivery platform 220, and/or computing resource 224. In some implementations, user device 210, AR delivery platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to generate augmented reality vehicle information for a scale model of a vehicle. In some implementations, one or more process blocks of FIG. 4 may be performed by an AR delivery platform (e.g., AR delivery platform 220). In some implementations, one or more process blocks of FIG. 4 may be performed by another device or a group of devices separate from or including the AR delivery platform, such as a user device (e.g., user device 210).

As shown in FIG. 4, process 400 may include receiving an image of a scale model of a vehicle, wherein the image is transmitted by a user device to the device (block 410). For example, the AR delivery platform (e.g., using computing resource 224, processor 320, communication interface 370, and/or the like) may receive an image of a scale model of a vehicle, as described above in connection with FIGS. 1A-2. In some implementations, the image may be transmitted by a user device to the device.

As further shown in FIG. 4, process 400 may include processing the image, with a model, to determine vehicle information associated with the scale model of the vehicle, wherein the vehicle information includes at least one of the image of the scale model of the vehicle, information identifying a year of the vehicle, information identifying a make of the vehicle, or information identifying a model of the vehicle (block 420). For example, the AR delivery platform (e.g., using computing resource 224, processor 320, memory 330, and/or the like) may process the image, with a model, to determine vehicle information associated with the scale model of the vehicle, as described above in connection with FIGS. 1A-2. In some implementations, the vehicle information may include at least one of the image of the scale model of the vehicle, information identifying a year of the vehicle, information identifying a make of the vehicle, or information identifying a model of the vehicle.

As further shown in FIG. 4, process 400 may include providing the vehicle information to the user device (block 430). For example, the AR delivery platform (e.g., using computing resource 224, processor 320, memory 330, communication interface 370, and/or the like) may provide the vehicle information to the user device, as described above in connection with FIGS. 1A-2.

As further shown in FIG. 4, process 400 may include receiving, from the user device, an input associated with the vehicle information (block 440). For example, the AR delivery platform (e.g., using computing resource 224, processor 320, communication interface 370, and/or the like) may receive, from the user device, an input associated with the vehicle information, as described above in connection with FIGS. 1A-2.

As further shown in FIG. 4, process 400 may include determining augmented reality vehicle information based on the input associated with the vehicle information, wherein the augmented reality vehicle information includes augmented reality information to be associated with the image of the scale model of the vehicle (block 450). For example, the AR delivery platform (e.g., using computing resource 224, processor 320, memory 330, and/or the like) may determine augmented reality vehicle information based on the input associated with the vehicle information, as described above in connection with FIGS. 1A-2. In some implementations, the augmented reality vehicle information may include augmented reality information to be associated with the image of the scale model of the vehicle.

As further shown in FIG. 4, process 400 may include providing the augmented reality vehicle information to the user device to enable the user device to associate the augmented reality vehicle information with the image of the scale model of the vehicle (block 460). For example, the AR delivery platform (e.g., using computing resource 224, processor 320, communication interface 370, and/or the like) may provide the augmented reality vehicle information to the user device to enable the user device to associate the augmented reality vehicle information with the image of the scale model of the vehicle, as described above in connection with FIGS. 1A-2.

Process 400 may include additional implementations, such as any single implementation or any combination of implementations described below and/or described with regard to any other process described herein.

In some implementations, the AR delivery platform may determine a particular vehicle in inventory that includes features that substantially match the augmented reality information, may determine financial information for the particular vehicle, where the financial information includes at least one of information indicating a price of the particular vehicle, or information indicating financing terms for the particular vehicle, and may provide the financial information to the user device. In some implementations, the AR delivery platform may receive, from the user device, an input associated with the financial information, may determine updated financial information based on the input associated with the financial information, and may provide the updated financial information to the user device.

In some implementations, the AR delivery platform may determine test drive information based on the vehicle type associated with the scale model of the vehicle, where the test drive information includes at least one of information indicating that a test drive is available for the vehicle, or information indicating a time of the test drive. Additionally, the AR delivery platform may receive, from the user device, an input associated with the test drive information, may determine updated test drive information based on the input associated with the test drive information, where the updated test drive information includes information indicating an updated time for the test drive of the vehicle, may provide, to the vehicle, instructions to drive to a location of the user device at the updated time, and may provide the updated test drive information to the user device.

In some implementations, the AR delivery platform may determine updated vehicle information based on the input associated with the vehicle information, and may provide the updated vehicle information to the user device. In some implementations, the AR delivery platform may determine projector information based on the input associated with the vehicle information, where the projector information includes information to be projected on the scale model of the vehicle, and may provide, to a projector associated with the scale model of the vehicle, the projector information to enable the projector to project the projector information on the scale model of the vehicle. In some implementations, the AR delivery platform may provide, to the user device, an augmented reality application to enable the user device to display the augmented reality vehicle information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning to generate augmented reality vehicle information for a scale model of a vehicle. In some implementations, one or more process blocks of FIG. 5 may be performed by an AR delivery platform (e.g., AR delivery platform 220). In some implementations, one or more process blocks of FIG. 5 may be performed by another device or a group of devices separate from or including the AR delivery platform, such as a user device (e.g., user device 210).

As shown in FIG. 5, process 500 may include receiving an image including image data of a scale model of a vehicle, wherein the image is captured by a user device (block 510). For example, the AR delivery platform (e.g., using computing resource 224, processor 320, communication interface 370, and/or the like) may receive an image including image data of a scale model of a vehicle, as described above in connection with FIGS. 1A-2. In some implementations, the image may be captured by a user device.

As further shown in FIG. 5, process 500 may include processing the image data, with a model, to identify a make, a model, and/or a year represented by the scale model of the vehicle (block 520). For example, the AR delivery platform (e.g., using computing resource 224, processor 320, storage component 340, and/or the like) may process the image data, with a model, to identify a make, a model, and/or a year represented by the scale model of the vehicle, as described above in connection with FIGS. 1A-2.

As further shown in FIG. 5, process 500 may include determining augmented reality vehicle information of a real world version of the vehicle based on the make, the model, and/or the year represented by the scale model of the vehicle, wherein the augmented reality vehicle information includes augmented reality information to be associated with the image of the scale model of the vehicle (block 530). For example, the AR delivery platform (e.g., using computing resource 224, processor 320, memory 330, and/or the like) may determine augmented reality vehicle information of a real-world version of the vehicle based on the make, the model, and/or the year represented by the scale model of the vehicle, as described above in connection with FIGS. 1A-2. In some implementations, the augmented reality vehicle information may include augmented reality information to be associated with the image of the scale model of the vehicle.

As further shown in FIG. 5, process 500 may include providing the augmented reality vehicle information to the user device to enable the user device to associate the augmented reality vehicle information with the image of the scale model of the vehicle (block 540). For example, the AR delivery platform (e.g., using computing resource 224, processor 320, communication interface 370, and/or the like) may provide the augmented reality vehicle information to the user device to enable the user device to associate the augmented reality vehicle information with the image of the scale model of the vehicle, as described above in connection with FIGS. 1A-2.

As further shown in FIG. 5, process 500 may include receiving, from the user device, an input associated with the augmented reality vehicle information (block 550). For example, the AR delivery platform (e.g., using computing resource 224, processor 320, communication interface 370, and/or the like) may receive, from the user device, an input associated with the augmented reality vehicle information, as described above in connection with FIGS. 1A-2.

As further shown in FIG. 5, process 500 may include determining updated augmented reality vehicle information based on the input associated with the augmented reality vehicle information (block 560). For example, the AR delivery platform (e.g., using computing resource 224, processor 320, memory 330, and/or the like) may determine updated augmented reality vehicle information based on the input associated with the augmented reality vehicle information, as described above in connection with FIGS. 1A-2.

As further shown in FIG. 5, process 500 may include providing the updated augmented reality vehicle information to the user device to enable the user device to associate the updated augmented reality vehicle information with the image of the scale model of the vehicle (block 570). For example, the AR delivery platform (e.g., using computing resource 224, processor 320, communication interface 370, and/or the like) may provide the updated augmented reality vehicle information to the user device to enable the user device to associate the updated augmented reality vehicle information with the image of the scale model of the vehicle, as described above in connection with FIGS. 1A-2.

Process 500 may include additional implementations, such as any single implementation or any combination of implementations described below and/or described with regard to any other process described herein.

In some implementations, the AR delivery platform may determine financial information based on the make, the model, and/or the year represented by the scale model of the vehicle, where the financial information includes at least one of information indicating a price of the vehicle, or information requesting information associated with a user of the user device, and may provide the financial information to the user device. In some implementations, the AR delivery platform may receive, from the user device, the information associated with the user of the user device, may determine updated financial information based on the information associated with the user of the user device, where the updated financial information includes information indicating financing terms for the user, and may provide the updated financial information to the user device.

In some implementations, the AR delivery platform may determine test drive information for a vehicle that includes features substantially similar to the make, the model, and/or the year represented by the scale model of the vehicle (e.g., the includes sixty percent, seventy percent, eighty percent, and/or the like of the features of the scale model of the vehicle), where the test drive information includes information indicating that a test drive is available for the vehicle, may determine augmented reality test drive information based on the test drive information, and may provide, to the user device, the augmented reality test drive information to enable the user to experience an augmented reality test drive of the vehicle via the user device. In some implementations, the augmented reality vehicle information may be associated with one or more of an optional color of the vehicle, an optional accessory of the vehicle, or an option associated with the vehicle.

In some implementations, the AR delivery platform may determine projector information based on the make, the model, and the year represented by the scale model of the vehicle, where the projector information includes information to be projected on the scale model of the vehicle, and may provide, to a projector associated with the scale model of the vehicle, the projector information to enable the projector to project the projector information on the scale model of the vehicle. In some implementations, the AR delivery platform may provide, to the user device, an application to enable the user device to display the augmented reality vehicle information and the updated augmented reality vehicle information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning to generate augmented reality vehicle information for a scale model of a vehicle. In some implementations, one or more process blocks of FIG. 6 may be performed by a user device (e.g., user device 210). In some implementations, one or more process blocks of FIG. 6 may be performed by another device or a group of devices separate from or including the user device, such as an AR delivery platform (e.g., AR delivery platform 220).

As shown in FIG. 6, process 600 may include receiving an image of a scale model of a vehicle (block 610). For example, the user device (e.g., using computing resource 224, processor 320, input component 350, communication interface 370, and/or the like) may receive an image of a scale model of a vehicle, as described above in connection with FIGS. 1A-2.

As further shown in FIG. 6, process 600 may include processing the image, with a model, to identify a vehicle type associated with the scale model of the vehicle (block 620). For example, the user device (e.g., using computing resource 224, processor 320, storage component 340, and/or the like) may process the image, with a model, to identify a vehicle type associated with the scale model of the vehicle, as described above in connection with FIGS. 1A-2.

As further shown in FIG. 6, process 600 may include determining augmented reality vehicle information based on the vehicle type associated with the scale model of the vehicle, wherein the augmented reality vehicle information includes augmented reality information to be associated with the image of the scale model of the vehicle (block 630). For example, the user device (e.g., using computing resource 224, processor 320, memory 330, and/or the like) may determine augmented reality vehicle information based on the vehicle type associated with the scale model of the vehicle, as described above in connection with FIGS. 1A-2. In some implementations, the augmented reality vehicle information may include augmented reality information to be associated with the image of the scale model of the vehicle.

As further shown in FIG. 6, process 600 may include providing, for display, the augmented reality vehicle information in association with the image of the scale model of the vehicle (block 640). For example, the user device (e.g., using computing resource 224, processor 320, output component 360, communication interface 370, and/or the like) may provide, for display, the augmented reality vehicle information in association with the image of the scale model of the vehicle, as described above in connection with FIGS. 1A-2.

As further shown in FIG. 6, process 600 may include receiving an input associated with the augmented reality vehicle information (block 650). For example, the user device (e.g., using computing resource 224, processor 320, input component 350, communication interface 370, and/or the like) may receive an input associated with the augmented reality vehicle information, as described above in connection with FIGS. 1A-2.

As further shown in FIG. 6, process 600 may include determining updated augmented reality vehicle information based on the input associated with the augmented reality vehicle information (block 660). For example, the user device (e.g., using computing resource 224, processor 320, memory 330, and/or the like) may determine updated augmented reality vehicle information based on the input associated with the augmented reality vehicle information, as described above in connection with FIGS. 1A-2.

As further shown in FIG. 6, process 600 may include providing, for display, the updated augmented reality vehicle information in association with the image of the scale model of the vehicle (block 670). For example, the user device (e.g., using computing resource 224, processor 320, output component 360, communication interface 370, and/or the like) may provide, for display, the updated augmented reality vehicle information in association with the image of the scale model of the vehicle, as described above in connection with FIGS. 1A-2.

Process 600 may include additional implementations, such as any single implementation or any combination of implementations described below and/or described with regard to any other process described herein.

In some implementations, the user device may provide, to a device, the vehicle type associated with the scale model of the vehicle, and may receive, from the device, financial information based on the vehicle type associated with the scale model of the vehicle, where the financial information includes at least one of information indicating a price of the vehicle, or information indicating financing terms for the vehicle. In some implementations, the user device may receive, from a device, an application to enable the user device to display the augmented reality vehicle information and the updated augmented reality vehicle information.

In some implementations, the augmented reality vehicle information may be associated with one or more of a color of the vehicle, an accessory of the vehicle, or an option associated with the vehicle. In some implementations, the user device may determine projector information based on the vehicle type associated with the scale model of the vehicle, where the projector information includes information to be projected on the scale model of the vehicle, and may provide, to a projector associated with the scale model of the vehicle, the projector information to enable the projector to project the projector information on the scale model of the vehicle.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
sending, by a device, image data of a scale model of a vehicle,
wherein the scale model of the vehicle corresponds to one or more available vehicles in an inventory of a vehicle dealer;
receiving, by the device, vehicle information based on a processing of the image data of the scale model of the vehicle,
wherein the vehicle information includes at least one of:
information identifying a year of the vehicle,
information identifying a make of the vehicle, or information identifying a vehicle model of the vehicle;
transmitting, by the device, an input associated with the vehicle information;
receiving, by the device and based on transmitting the input, augmented reality vehicle information that corresponds to an available vehicle of the one or more available vehicles,
 the augmented reality vehicle information indicating one or more vehicle options affecting an appearance of the available vehicle;
associating, by the device, the augmented reality vehicle information with the image data of the scale model of the vehicle; and
displaying, by the device, the one or more vehicle options using augmented reality to reflect the appearance of the available vehicle on the scale model of the vehicle.

2. The method of claim 1, further comprising:
receiving financial information for the available vehicle, wherein the financial information includes at least one of:
 information indicating a price of the available vehicle, or
 information indicating financing terms for the available vehicle; and
displaying the financial information on a user interface associated with the device.

3. The method of claim 2, further comprising:
sending an input associated with the financial information; and
receiving updated financial information based on a determination of the updated financial information based on the input associated with the financial information.

4. The method of claim 1, further comprising:
receiving test drive information based on the vehicle information associated with the scale model of the vehicle,
 wherein the test drive information includes at least one of:
 information indicating that a test drive is available for at least one of the one or more available vehicles, or
 information indicating a time of the test drive; and
displaying the test drive information via a user interface associated with the device.

5. The method of claim 1, further comprising:
receiving updated vehicle information based on user input associated with the vehicle information; and
displaying the updated vehicle information.

6. The method of claim 1, wherein the one or more vehicle options comprise one or more of:
a color of the available vehicle, or
an accessory of the available vehicle.

7. The method of claim 1, wherein:
an appearance of the scale model of the vehicle reflects a base model of the available vehicle; and
the one or more vehicle options are not included in the base model of the available vehicle and not reflected in the appearance of the scale model of the vehicle.

8. A device, comprising:
one or more memories; and
one or more processors communicatively coupled to the one or more memories, configured to:
 determine vehicle information based on processing image data of a scale model of a vehicle,
  wherein the scale model of the vehicle corresponds to one or more available vehicles in an inventory of a vehicle dealer, and
  wherein the vehicle information includes at least one of:
   information identifying a year of the vehicle,
   information identifying a make of the vehicle, or
   information identifying a vehicle model of the vehicle;
 transmit an input associated with the vehicle information;
 receive, based on transmitting the input, augmented reality vehicle information that corresponds to an available vehicle of the one or more available vehicles,
  the augmented reality vehicle information indicating one or more vehicle options affecting an appearance of the available vehicle;
 associate the augmented reality vehicle information with the image data of the scale model of the vehicle; and
 display the one or more vehicle options using augmented reality to reflect the appearance of the available vehicle on the scale model of the vehicle.

9. The device of claim 8, wherein the one or more processors are further configured to:
receive financial information for the available vehicle,
 wherein the financial information includes at least one of:
 information indicating a price of the available vehicle, or
 information indicating financing terms for the available vehicle; and
display the financial information on a user interface associated with the device.

10. The device of claim 9, wherein the one or more processors are further configured to:
send an input associated with the financial information; and
receive updated financial information based on a determination of the updated financial information based on the input associated with the financial information.

11. The device of claim 8, wherein the one or more processors are further configured to:
receive test drive information based on the vehicle information associated with the scale model of the vehicle,
 wherein the test drive information includes at least one of:
 information indicating that a test drive is available for at least one of the one or more available vehicles, or
 information indicating a time of the test drive; and
display the test drive information via a user interface associated with the device.

12. The device of claim 8, wherein the one or more processors are further configured to:
receive updated vehicle information based on user input associated with the vehicle information; and
display the updated vehicle information.

13. The device of claim 8, wherein the one or more vehicle options comprise one or more of:
a color of the available vehicle, or
an accessory of the available vehicle.

14. The device of claim 8, wherein:
an appearance of the scale model of the vehicle reflects a base model of the available vehicle; and the one or more vehicle options are not included in the base model of the available vehicle and not reflected in the appearance of the scale model of the vehicle.

15. A non-transitory computer-readable medium storing instructions, the instructions comprising:
one or more instructions that, when executed by one or more processors, cause the one or more processors to:
determine vehicle information based on processing image data of a scale model of a vehicle,
wherein the scale model of the vehicle corresponds to one or more available vehicles in an inventory of a vehicle dealer, and
wherein the vehicle information includes at least one of:
information identifying a year of the vehicle,
information identifying a make of the vehicle, or
information identifying a vehicle model of the vehicle;
transmit an input associated with the vehicle information;
receive, based on transmitting the input, augmented reality vehicle information that corresponds to an available vehicle of the one or more available vehicles,
the augmented reality vehicle information indicating one or more vehicle options affecting an appearance of the available vehicle;
associate the augmented reality vehicle information with the image data of the scale model of the vehicle; and
display the one or more vehicle options using augmented reality to reflect the appearance of the available vehicle on the scale model of the vehicle.

16. The non-transitory computer-readable medium of claim 15, wherein the one or more instructions, when executed by the one or more processors, further cause the one or more processors to:
receive financial information for the available vehicle,
wherein the financial information includes at least one of:
information indicating a price of the available vehicle, or
information indicating financing terms for the available vehicle; and
display the financial information on a user interface.

17. The non-transitory computer-readable medium of claim 16, wherein the one or more instructions, when executed by the one or more processors, further cause the one or more processors to:
send an input associated with the financial information; and
receive updated financial information based on a determination of the updated financial information based on the input associated with the financial information.

18. The non-transitory computer-readable medium of claim 15, wherein the one or more instructions, when executed by the one or more processors, further cause the one or more processors to:
receive test drive information based on the vehicle information associated with the scale model of the vehicle,
wherein the test drive information includes at least one of:
information indicating that a test drive is available for at least one of the one or more available vehicles, or
information indicating a time of the test drive; and
display the test drive information via a user interface.

19. The non-transitory computer-readable medium of claim 15, wherein the one or more instructions, when executed by the one or more processors, further cause the one or more processors to:
receive updated vehicle information based on user input associated with the vehicle information; and
display the updated vehicle information.

20. The non-transitory computer-readable medium of claim 15, wherein the one or more vehicle options comprise one or more of:
a color of the available vehicle, or
an accessory of the available vehicle.

* * * * *